(12) United States Patent
DiFrancesco et al.

(10) Patent No.: US 11,417,206 B2
(45) Date of Patent: Aug. 16, 2022

(54) SWITCHING AN OPERATION MODE BASED ON THE SPEED OF USER EQUIPMENT

(71) Applicants: Sony Europe Limited, Weybridge (GB); Sony Corporation, Tokyo (JP)

(72) Inventors: Renaud DiFrancesco, London (GB); Nigel Stuart Moore, Berkshire (GB)

(73) Assignees: Sony Europe B.V., Weybridge (GB); Sony Corporation, Tokyo (JP)

(*) Notice: Subject to any disclaimer, the term of this patent is extended or adjusted under 35 U.S.C. 154(b) by 114 days.

(21) Appl. No.: 16/329,384

(22) PCT Filed: Aug. 16, 2017

(86) PCT No.: PCT/GB2017/052414
§ 371 (c)(1),
(2) Date: Feb. 28, 2019

(87) PCT Pub. No.: WO2018/046881
PCT Pub. Date: Mar. 15, 2018

(65) Prior Publication Data
US 2019/0197888 A1   Jun. 27, 2019

(30) Foreign Application Priority Data
Sep. 7, 2016 (GB) ...................... 1615192

(51) Int. Cl.
*G08G 1/052* (2006.01)
*G08G 1/01* (2006.01)
(Continued)

(52) U.S. Cl.
CPC ............ *G08G 1/052* (2013.01); *G06F 3/14* (2013.01); *G08G 1/0116* (2013.01);
(Continued)

(58) Field of Classification Search
CPC .... G08G 1/052; G08G 1/0133; G08G 1/0141; G08G 1/13; G08G 1/0016; G08G 1/08;
(Continued)

(56) References Cited

U.S. PATENT DOCUMENTS 7,378,948 B2   5/2008   Somuah
9,381,813 B2   7/2016   Hampiholi et al.
(Continued)

FOREIGN PATENT DOCUMENTS

EP         1 421 470 B1   10/2007
WO   WO 2009/080065 A1   7/2009
(Continued)

OTHER PUBLICATIONS

International Search Report dated Jan. 30, 2018 in PCT/GB2017/052414, 6 pages.
(Continued)

*Primary Examiner* — Aaron L Troost
(74) *Attorney, Agent, or Firm* — Oblon, McClelland, Maier & Neustadt, L.L.P.

(57) ABSTRACT

User equipment comprising communication circuitry configured to communicate data with infrastructure equipment and controller circuitry configured to: operate in a first mode using a first communication protocol and operate in a second mode using a second communication protocol, wherein the first communication protocol has a higher bandwidth than the second communication protocol; and switch operation from the second mode to the first mode when the user equipment is at or below a threshold speed.

19 Claims, 12 Drawing Sheets

(51) Int. Cl.
*G08G 1/08* (2006.01)
*H04W 36/32* (2009.01)
*G06F 3/14* (2006.01)
*G08G 1/13* (2006.01)
*H04W 4/02* (2018.01)
*H04W 48/18* (2009.01)
*H04W 88/06* (2009.01)
*H04W 36/02* (2009.01)
*H04W 84/12* (2009.01)
*H04W 84/00* (2009.01)

(52) U.S. Cl.
CPC ......... *G08G 1/0133* (2013.01); *G08G 1/0141* (2013.01); *G08G 1/08* (2013.01); *G08G 1/13* (2013.01); *H04W 4/027* (2013.01); *H04W 36/32* (2013.01); *H04W 36/02* (2013.01); *H04W 48/18* (2013.01); *H04W 84/005* (2013.01); *H04W 84/12* (2013.01); *H04W 88/06* (2013.01)

(58) Field of Classification Search
CPC ..... H04W 36/32; H04W 4/027; H04W 48/18; H04W 88/06; H04W 36/02; H04W 84/12; H04W 84/005; H04W 8/245; H04W 84/22; H04W 84/0045; G06F 3/14
See application file for complete search history.

(56) References Cited

U.S. PATENT DOCUMENTS

| | | |
|---|---|---|
| 2003/0055537 A1 | 3/2003 | Odinak et al. |
| 2003/0200012 A1 | 10/2003 | Odinak et al. |
| 2005/0055627 A1* | 3/2005 | Lloyd .................. G06F 40/131 715/275 |
| 2005/0143867 A1 | 6/2005 | Odinak et al. |
| 2007/0027628 A1 | 2/2007 | Geelen |
| 2008/0140277 A1 | 6/2008 | Odinak et al. |
| 2008/0233958 A1 | 9/2008 | Robbins et al. |
| 2011/0066314 A1 | 3/2011 | Odinak et al. |
| 2011/0172909 A1 | 7/2011 | Kahn et al. |
| 2011/0172917 A1 | 7/2011 | Muzina et al. |
| 2011/0249032 A1 | 10/2011 | Bells et al. |
| 2013/0051251 A1 | 2/2013 | Wang et al. |
| 2014/0235244 A1* | 8/2014 | Hinman ................ H04W 36/14 455/436 |
| 2014/0274069 A1 | 9/2014 | Scheim et al. |
| 2015/0045021 A1 | 2/2015 | Schlatter et al. |
| 2015/0055627 A1 | 2/2015 | Robbins et al. |
| 2015/0119101 A1 | 4/2015 | Cui et al. |
| 2016/0150451 A1 | 5/2016 | Barreto De Miranda Sargento et al. |
| 2017/0188287 A1 | 6/2017 | Robbins et al. |

FOREIGN PATENT DOCUMENTS

| | | |
|---|---|---|
| WO | WO 2013/ 147832 A1 | 10/2013 |
| WO | WO 2014/051417 A1 | 4/2014 |

OTHER PUBLICATIONS

Search Report dated Feb. 14, 2017 in corresponding United Kingdom Patent Application No. GB1615192.0, 5 pages.
Varun Singh et al., "Predictive Buffering for Streaming Video in 3G Networks", World of Wireless, Mobile and Multimedia Networks (WOWMOM), 2012 IEEE, XP032220165, Jun. 25, 2012, 10 pages.
Darren Quick, "GM Developing Vehicle-to-vehicle and Vehicle-to-infrastructure Communications Systems", Automotive, Oct. 18, 2011, 3 pages, http://newatlas.com/gm-vehicle-communications/20187/.

* cited by examiner

| Identifier | Current location | Current Speed | Likely Route | Outstanding data |
|---|---|---|---|---|
| 100A | 315A | 0km/h | 315B, 315C | Firmware Update |
| ... | | | | |
| 100D | Between 315A and 315B | 20km/h | 315B, 315C | Music, 4K video stream |
| ... | | | | |

FIG. 5

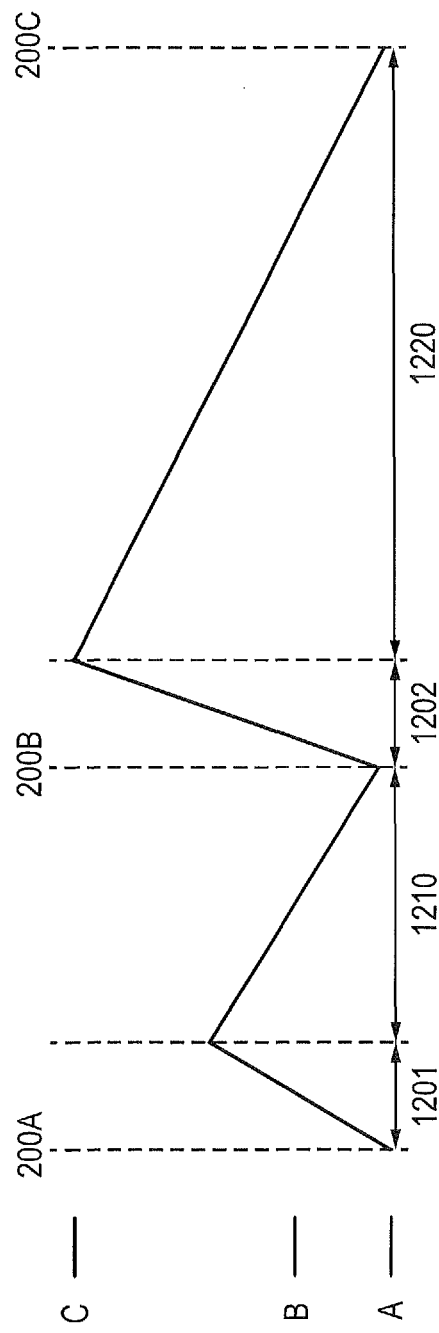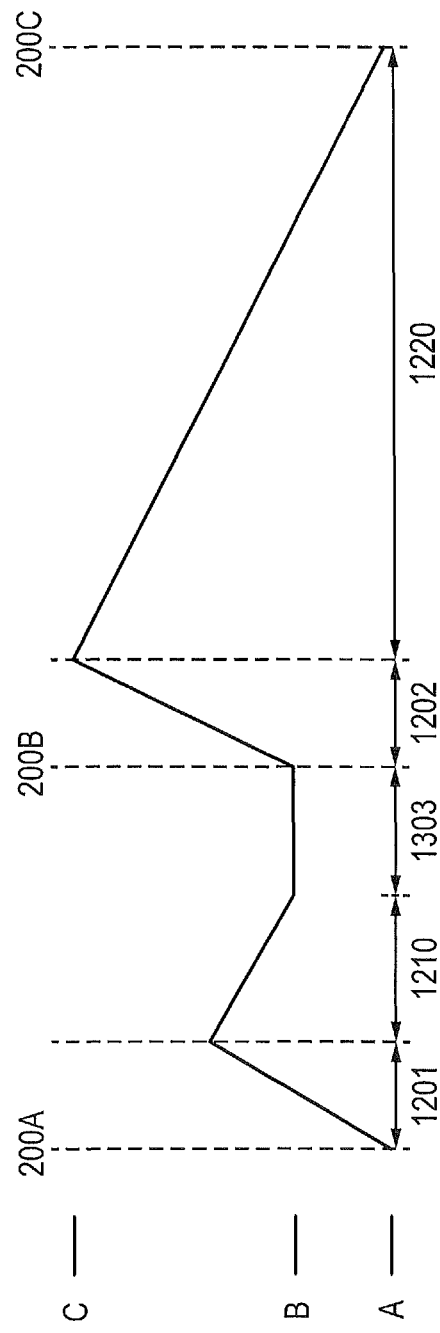

SWITCHING AN OPERATION MODE BASED ON THE SPEED OF USER EQUIPMENT

BACKGROUND

Field of the Disclosure

The present technique relates to a method, apparatus and non-transitory storage medium.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

Over the past few years, street furniture, and in particular, traffic lights have been intelligently controlled to monitor and ensure the flow of traffic around an urban environment such as a city centre. This has meant a significant investment has been made in infrastructure allowing data to flow around these pieces of street furniture.

With the advent of Vehicle-to-Vehicle (V2V), Vehicle-to-Infrastructure (V2I) and Vehicle-to-Everything (V2X) communication, the present disclosure aims to use this newly installed infrastructure.

SUMMARY

According to the disclosure, there is provided user equipment comprising communication circuitry configured to communicate data with infrastructure equipment and controller circuitry configured to: operate in a first mode using a first communication protocol and operate in a second mode using a second communication protocol, wherein the first communication protocol has a higher bandwidth than the second communication protocol; and switch operation from the second mode to the first mode when the user equipment is at or below a threshold speed.

Other features are provided in the accompanying claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 schematically shows a table stored in the system of FIG. 3;

FIGS. 12 and 13 show timing diagrams explaining the further embodiments.

DESCRIPTION OF THE EMBODIMENTS

Figure 1:
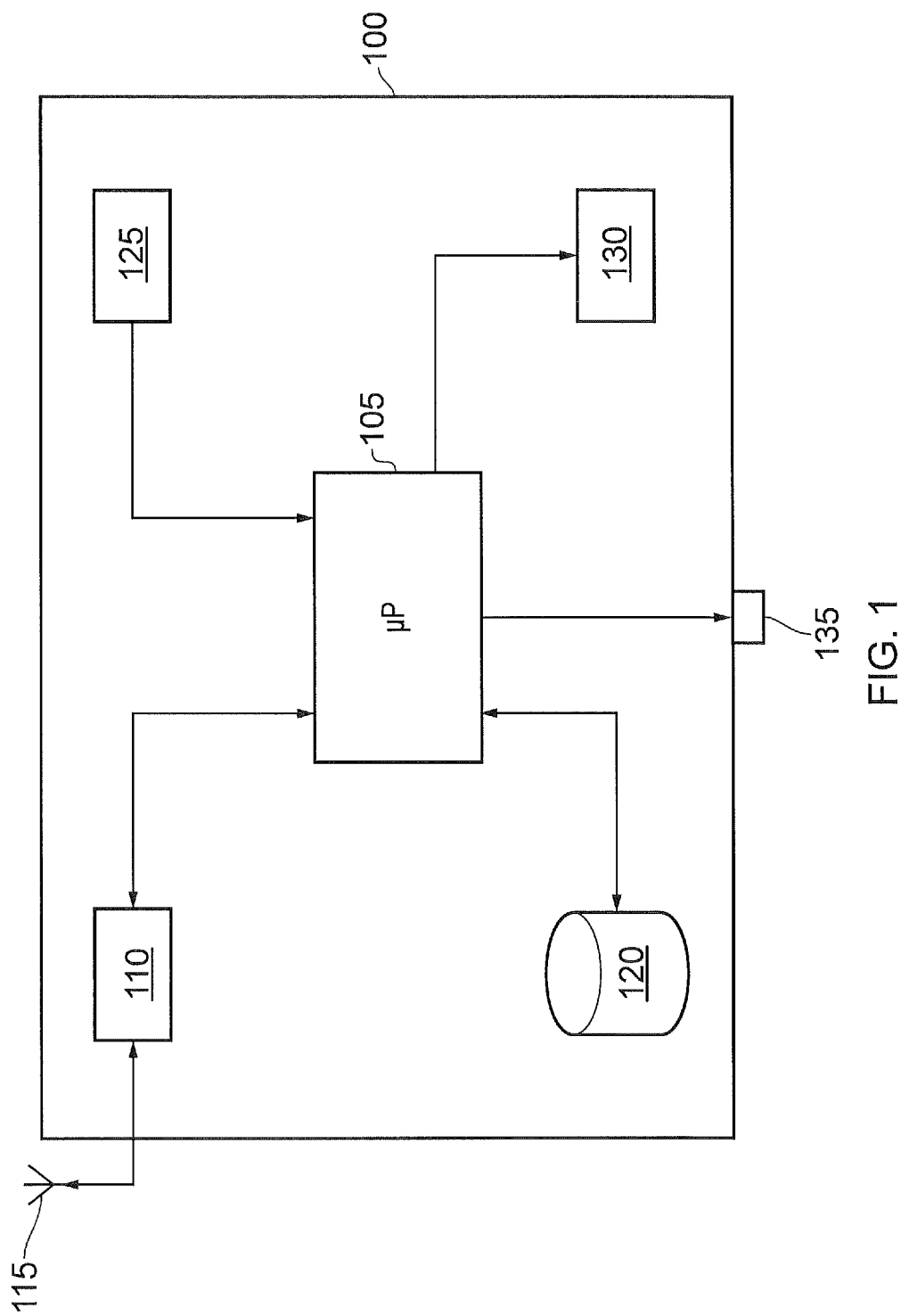
FIG. 1 schematically shows user equipment according to embodiments of the present disclosure.

Referring now to the drawings, wherein like reference numerals designate identical or corresponding parts throughout the several views.

FIG. 1 shows user equipment (UE) 100 according to embodiments of the present disclosure. The UE 100 may be in some embodiments a smartphone, tablet or any kind of portable device or terminal which may be carried or worn on the person. However, the disclosure is not limited to this and the UE 100 may be a vehicle bound device. It may act as a local wireless hub (such as a MiFi) allowing other UEs carried on the person to connect to it using either a wired or wireless link when located in the vehicle. The vehicle may be an autonomous vehicle.

The UE 100 will allow access for itself or for the connected devices to the internet using either a cellular network such as a 3G, LTE or 5G network or a broadband connection such as Wi-Fi, a microwave network, paired wireless link or any kind of other network. The UE 100 may be a so called TV white space device (TVWS) operating within normal frequency bands for terrestrial TV signals that are unused in a particular location.

The operation of the UE 100 is controlled by a controller 105. The controller 105 may take the form of a controller circuitry which is typically made of semiconductor material and which runs under the control of computer software embodied as computer readable code. This code may be stored within the controller 105 or may be stored elsewhere within the UE 100. In this specific example, the computer software is stored within storage medium 120 which is connected to the controller 105. Storage medium 120 may be formed of any kind of suitable media such as solid-state storage or magnetic or optical readable media. Other data such as user profile information, application data, and content is also stored on storage medium 120.

Also connected to controller 105 is a communication unit 110. The communication unit 110 may take the form of communication circuitry which is configured to communicate data to and from the UE 100. In embodiments, the data may be communicated wirelessly using a cellular network such as a 3G, LTE or 5G network or may be communicated using other types of network such as Wi-Fi (802.11a-n) or Bluetooth or on a point-to-point basis or the like. Indeed, it is envisaged that the communication unit 110 may contain several modules which allows the UE 100 to communicate over various networks and point-to-point systems at the same time. A module may operate in one distinct frequency band or be configured to switch between allowable frequency bands.

The communication unit 110 is connected to an antenna 115 which allows this data to be communicated wirelessly.

It is envisaged that the UE 100 will communicate with infrastructure equipment 200 which will be explained with reference to FIG. 2 using the communication unit 110 and the antenna 115.

The controller 105 is also connected to a user input module 125. The user input module 125 may be a touchscreen, stylus, keyboard, mouse, gesture recognition system or any kind of device suitable to allow the user to control the operation of the UE 100.

The controller 105 is also connected to a user output module 130. The user output module 130 may be a display (either integrated with the UE 100 or separate to the UE 100), haptic feedback, wearable technology such as a smartwatch or augmented reality glasses or goggles, or any kind of device suitable to allow the user to receive the output of the UE 100.

The controller 105 is also connected to a data output module 135. The data output module 135 allows the UE 100 to output the data to another device connected to the UE 100 using either a wired or wireless connection. Of course, this data may additionally or alternatively be provided to the other device using the communication unit 110.

Figure 2:
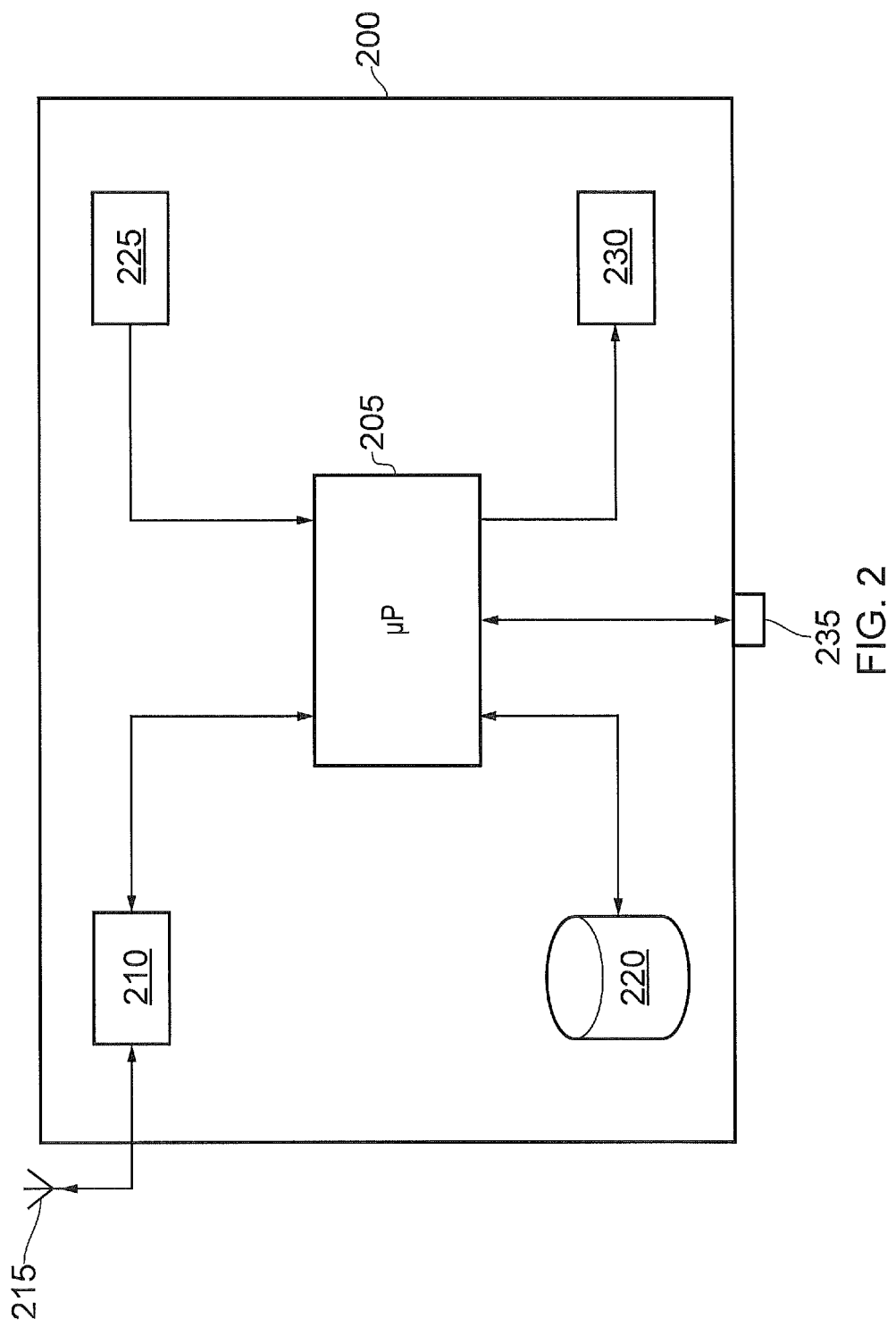
FIG. 2 schematically shows infrastructure equipment according to embodiments of the present disclosure.

FIG. 2 shows infrastructure equipment (IE) 200 according to embodiments of the present disclosure. The IE 200 may be in some embodiments a node used in V2I systems that communicates with a vehicle. Alternatively, or additionally, the IE 200 may be a router that routes data from the infrastructure to the UE 100.

The IE 200 will allow access for itself and for the connected UEs to the internet using either a cellular network such as a 3G, LTE or 5G network or a broadband connection such as Wi-Fi, a microwave network or any kind of other network. Where the IE 200 communicates to a UE which is a TVWS device, the IE may connect to a database server which allocates or provides permissions to use a particular channel (e.g. 6 MHz, 8 MHz) in a frequency band, for example to avoid interference with other signals such a TV signals in the same, contiguous or adjacent channels. Signalling to the UE to use a particular channel may be provided in an pre-allocated channel or network (e.g. Wi-Fi, cellular network) and/or using a predefined protocol.

The operation of the IE 200 is controlled by a controller 205. The controller 205 may take the form of a controller circuitry which is typically made of semiconductor material and which runs under the control of computer software embodied as computer readable code. This code may be stored within the controller 205 or may be stored elsewhere within the IE 200. In this specific example, the computer software is stored within storage medium 220 which is connected to the controller 205. Storage medium 220 may be formed of any kind of suitable media such as solid-state storage or magnetic or optical readable media. Other data such as user profile information, application data, and content is also stored on storage medium 220.

Also connected to controller 205 is a communication unit 210. The communication unit 210 may take the form of communication circuitry which is configured to communicate data to and from the UE 100. In embodiments, the data may be communicated wirelessly using a cellular network such as a 3G, LTE or 5G network or may be communicated using other types of network such as Wi-Fi (802.11a-n) or Bluetooth or on a point-to-point basis or the like. Indeed, it is envisaged that the communication unit 210 may contain several modules which allows the IE 200 to communicate over various networks and point-to-point systems at the same time.

The communication unit 210 is connected to an antenna 215 which allows this data to be communicated wirelessly.

The controller 205 is also connected to an input module 225. The input module 225 may be a touchscreen, stylus, keyboard, mouse, gesture recognition system or any kind of device suitable to allow for example a maintenance engineer to control the operation of the IE 200. Such control may be performed remotely through a network interface.

The controller 205 is also connected to an output module 230. The output module 230 may be a display (either integrated with the IE 200 or more likely separate to the IE 200), haptic feedback, wearable technology such as a smartwatch or augmented reality glasses or goggles, or any kind of device suitable to allow the maintenance engineer to receive the output of the IE 200.

The controller 205 is also connected to a data input/output (I/O) module 235. The data I/O module 235 allows the IE 200 to receive or send data to another device connected to the IE 200 using either a wired or wireless connection. Of course, this data may additionally or alternatively be provided to the other device using the communication unit 210. It is envisaged that the data input/output module 235 will be connected to the infrastructure network such as a data centre and/or other IEs 200 located on the network. This will be explained with reference to FIG. 3. The data I/O module 235 may be connected to the infrastructure using an optical fibre link or a dedicated microwave link to allow a large bandwidth connection.

Figure 3:
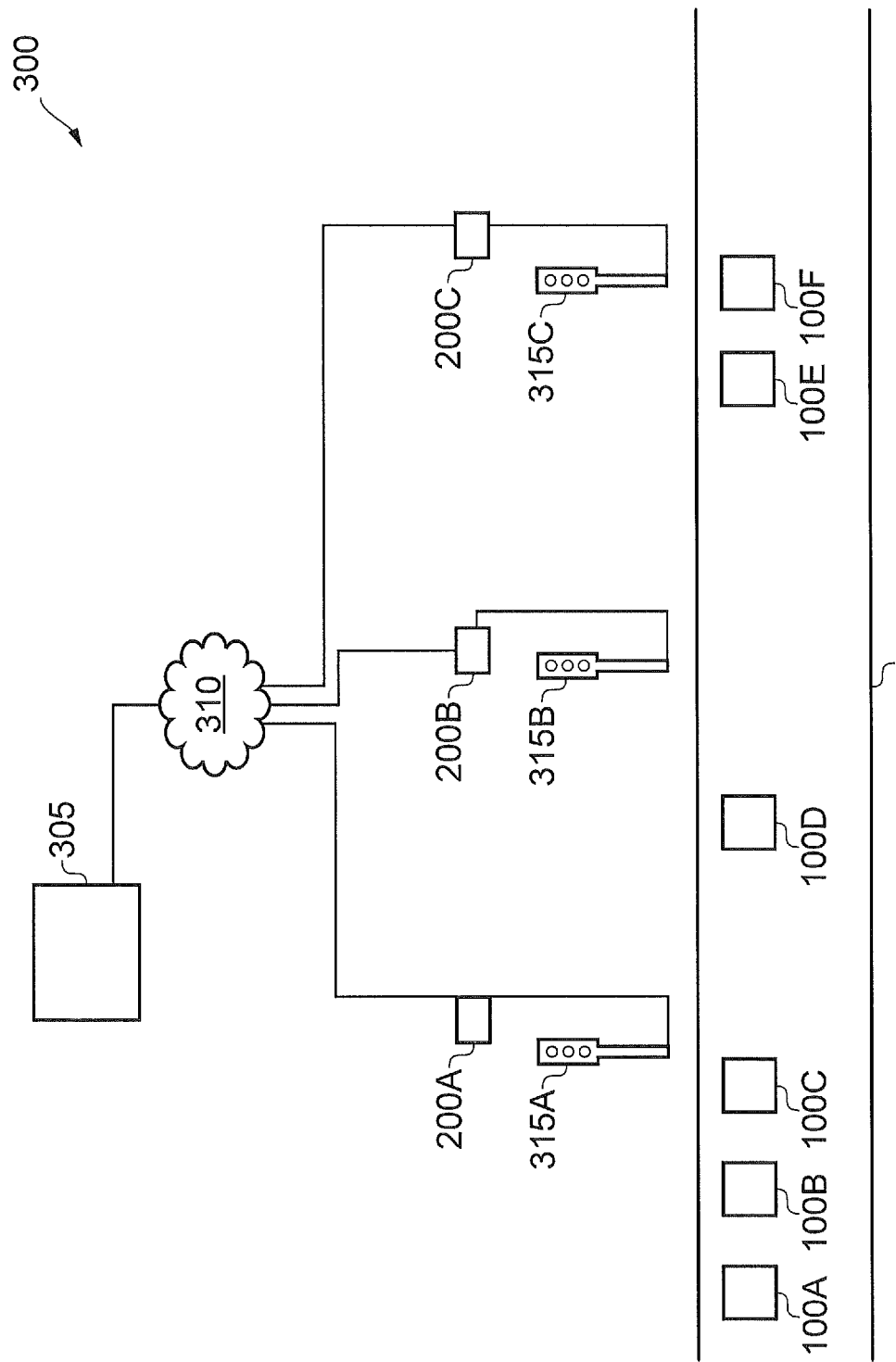
FIG. 3 schematically shows a system including the user equipment of FIG. 1 and the infrastructure equipment of FIG. 2.

FIG. 3 shows a system 300 according to embodiments of the disclosure. The system 300 includes a data centre 305. The data centre 305 contains large numbers of servers or other controlling systems that provide a core network to the infrastructure equipment located in a region. Moreover, the data centre 305 will also send and receive information pertaining to UEs communicating with the IEs from a cellular network. Specifically, the data centre 305 will transfer information relating to the position and speed of the various UEs to and from cellular network providers. The operation of the data centre 305 will become apparent from the following explanation.

The data centre 305 is connected to the IEs over a network 310. It is envisaged that this network will be a fibre network or a microwave network allowing a reliable high bandwidth connection between the data centre 305 and the various IEs located in a region. Of course, the disclosure is not limited to this and the network may be a virtual private network located on public infrastructure, or may be indeed the internet. It is envisaged, however, that if the network 310 is the internet, then the IEs and the data centre 305 will communicate on a secure layer such as the secure socket layer to ensure privacy of data. Communicated data or parts thereof may be encrypted.

In the example embodiment of FIG. 3, a first IE 200A, a second IE 200B and a third IE 200C are provided. These three IEs are connected to the network 310 using a wired connection. Specifically, the network 310 is connected to the three IEs using the data I/O module 235 located within each IE.

Additionally, each IE 200A-200C is connected to, mounted on or affixed to a respective piece of street furniture. The term street furniture is known in the art and means any kind of apparatus that is located on the street either permanently or temporarily. This may be a bus or tram stop, a street light, parking meter, seating, traffic light, advertising display, container for litter, kiosk, control unit for a cluster of traffic lights or plurality of lights at an intersection, a pick up drop off point or container for mail or courier services, a vending machine or the like. Street furniture in the sense of the disclosure includes IE located in drainage or other underground access ports in the pavement or roadway.

In example embodiments, each IE is connected to a respective traffic light. So, in FIG. 3, the first IE 200A is connected to a first traffic light 315A, the second IE 200B is connected to a second traffic light 315B and the third IE 200C is connected to a third traffic light 315C. It is envisaged that the street furniture will be connected to the IE using the data I/O module 235 within the respective IE. Of course, the disclosure is not so limited and the street furniture may be connected using any kind of wired or wireless connection. As will be appreciated, it is not necessary to connect one IE to one piece of street furniture. It may be that each IE may be connected to a plurality of pieces of street furniture. So, in the example of FIG. 3, it is possible that one IE 200 may be connected to the first, second and third traffic light 315A-C.

Referring back to FIG. 3, a road 320 is provided between the three traffic lights 315A-C. Along this road is provided six vehicles at various locations and speeds. Within each vehicle is a UE 100 as explained with reference to FIG. 1. Accordingly, as each vehicle has a UE, FIG. 3 shows six UEs located at various positions and travelling at various speeds along road 320.

In the example of FIG. 3, first, second and third UEs 100A-C are stationary next to the first traffic light 315A; fourth UE 100D is travelling at its cruising speed between the first traffic light 315A and the second traffic light 315B; and fifth and sixth UE 100E-F are stationary next to the third traffic light 315C. As will become apparent from this example, the first, second and third UE 100A-C will communicate with the first IE 200A; the fourth UE 100D will communicate over a cellular network; and the fifth and sixth UE 100E-F will communicate with the third IE 200C.

Figure 4:
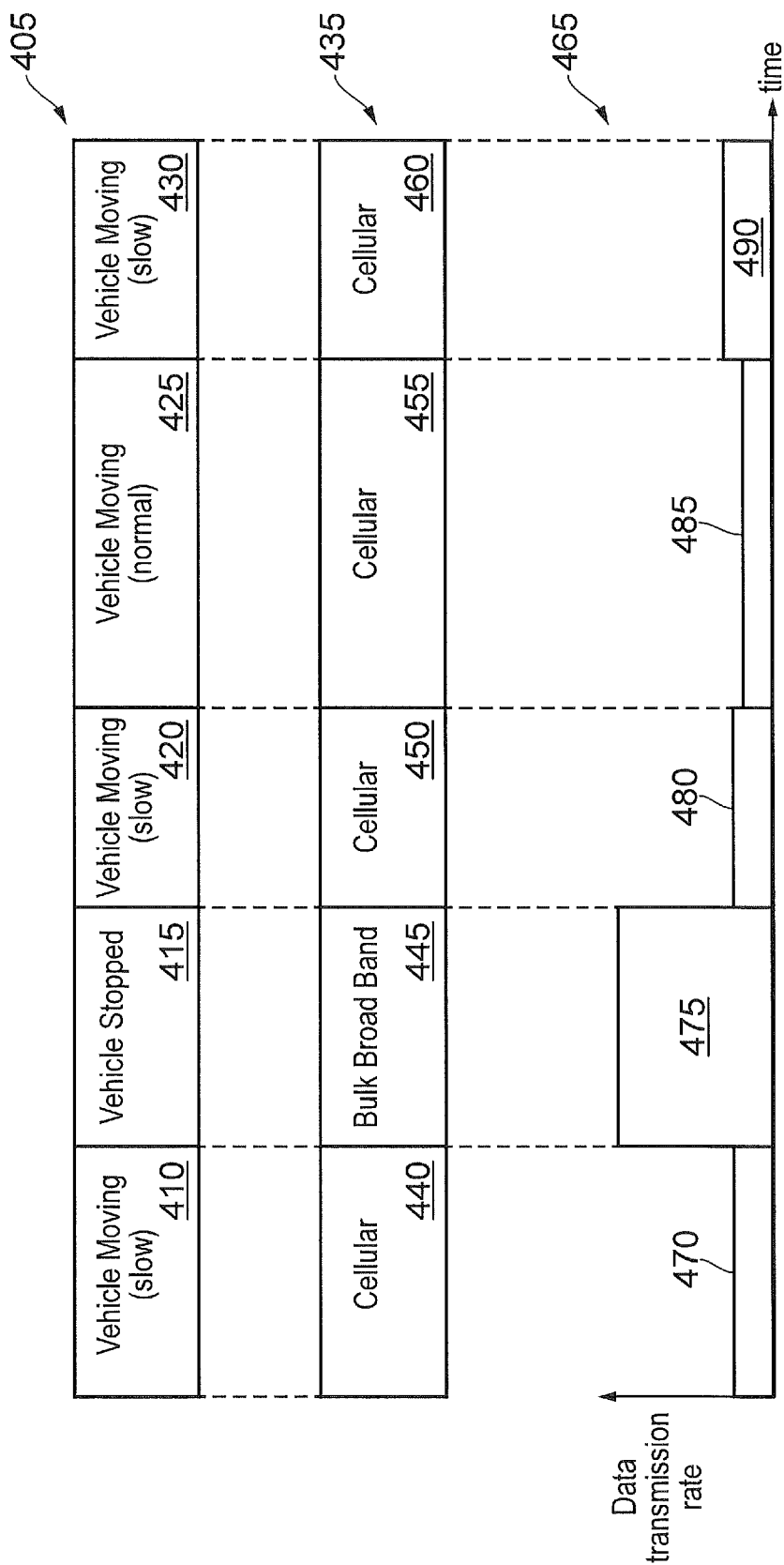
FIG. 4 schematically illustrates the operation of a UE within the system of FIG. 3.

Referring to FIG. 4, an exemplary embodiment of the operation of a UE within the system of FIG. 3 is shown. In chart 405, the speed characteristics are shown of the vehicle into which the UE is located. This means that chart 405 shows the speed characteristics of the UE 100. In block 410, the vehicle is moving slowly. This may be because of slow moving traffic queuing at a traffic light or because of congestion. In any event, at this point, as the vehicle is moving slowly through traffic, the UE 100 will communicate over a cellular network as noted in block 440. As the vehicle is moving, and communicating in a first mode over a cellular network, the rate at which data is transferred with the cellular network is dependent upon the connection between the UE 100 and the cellular network. In other words, as the vehicle is moving slowly, speed will not adversely impact the connection between the UE 100 and the cellular network. This is shown by the data transmission (and reception) rate 470. During this period, the data centre 305 receives positional information about the UE 100 from the cellular network (not shown). In embodiments, positional information may be determined from GPS or other sensors in the UE 100. Such positional information may be conveyed via the cellular network.

When the vehicle is stopped at a traffic light, the UE 100 communicates with the IE 200. For example, in the system of FIG. 3, the sixth UE 100F will communicate with the third traffic light 315C as the sixth UE 100F is stationary at the traffic light.

Specifically, the communication unit 110 of the UE will connect to the communication unit 210 of the IE 200 and will begin communicating over this connection in a second mode. This connection will be activated by the third traffic light 315C sending a signal to the UE 100 telling the UE 100 that the vehicle is approaching a stop light and thus that the UE 100 will be stationary. Of course, the UE may determine using its own GPS or sensors that it is stationary or almost stationary. In embodiments, stationary means a presumption that the vehicle will be stationary. This presumption may or may not be confirmed by position information from the UE. It may be sufficient for the initiation of a connection to presume that the UE is stationary. More generally, of course, the UE does not have to be stationary of almost stationary. It is possible that the UE needs only be travelling at a speed less than a threshold of, for example, 15 km/h or the like.

As the UE 100 is stationary and within a close proximity to the traffic light, the connection between the UE 100 and the IE 200 will be reliable and capable of maintaining a high data transmission rate. There may be a reduced bit error rate in the communication to a stationary UE in comparison to a similar UE that is in motion. The error rate may increase as motion increases. In other words, the UE 100 will communicate with the IE 200 using a shorter effective range, higher throughput data transmission protocol such as Wi-Fi or NFC (this is termed Bulk-Broadband 445 in FIG. 4). As shown in FIG. 4, the transmission rate 475 of the Bulk-Broadband is much higher than the cellular network connection. In other words, the bandwidth of the bulk-broadband, second communication protocol) is higher than that of the cellular, first communication protocol. Moreover, as noted above, as the vehicle is stationary, the connection will be more reliable than a cellular connection. Further, as the traffic lights are controlled, the IE 200 knows the minimum duration of time that the vehicle will be stationary. This is because the traffic light (and thus the IE) will know for how long the traffic light will remain at stop, or is likely to remain at stop if this is determined by sensors local to the traffic light. The length of the "stop" may be stored for example in traffic light phasing information at the data centre 305. As will be explained later, this allows specific types of data to be communicated to the UE 100. In embodiments, some of the data transferred in the second mode may be required or useful input information for the operation of a vehicle or autonomous vehicle. It may be information that is used for an autonomous vehicle to arrange itself with respect to other vehicles for example in a platoon. This arrangement may be for example to bunch all vehicles turning left to optimise space or to arrange vehicle parking, for example in an optimised manner.

In some embodiments the IE 200 offers a connection to the UE 100 when the traffic light is about to indicate "stop". It may determine which UEs are likely to be within range by virtue of position information sent by the UEs (e.g. GPS information relayed by cellular network). In some embodiments the initiation or offering of a connection is via the first communication protocol or cellular network. In response to the initiation or offering, the UE may power up a module (or circuitry) suitable for completing the connection for receiving data in the second communication protocol (e.g. Wi-Fi). In this way traffic light control systems (e.g. from data centre 305) and signals become interlinked with communication networks and data of UEs. Generally, physical traffic control systems can be used to control or influence data traffic on networks efficiently and can also influence power consumption by UEs by appropriately turning on and off different transceiver circuitry within the devices.

When the traffic light changes to "go", the traffic light will communicate this to the UE 100. The UE 100 will thus communicate using the cellular network again. This change may be sent as instructions. The instructions may be to start to communicate via the cellular network a few seconds before the traffic light changes, as the traffic light changes or shortly after the traffic light changes. In some embodiments the communication via bulk broadband may be substantially unaffected by UE 100 travelling at a very low speed towards or away from the traffic lights, for example at less than 15 km/h, but still within operating range of IE 200. As the vehicle moves away from the traffic light in block 420, the vehicle is moving slowly. Accordingly, and as noted above, the UE 100 will then communicate using the cellular network as noted in block 450. As the UE 100 is communicating over a cellular connection, the data transmission and reception rate is shown in block 480. As is evident, this rate is similar to that when the vehicle was last moving slowly in block 470.

As the vehicle moves further away from the traffic light in block 425 at its cruising or normal speed, the UE will communicate with a cellular network. However, as the UE 100 is moving more quickly, the transmission rate is likely to be lower than when moving slowly. Moreover, the connection with the cellular network will be less stable than when the vehicle is moving slowly or is stationary. Again, this determines the data that is to be transmitted to the UE 100.

Finally, when the vehicle begins to slow again (but still moving) in block 430, the connection will still be a cellular connection as shown in block 460, but the data transmission and reception rate will gradually increase from the situation where the vehicle is moving at its cruising speed. Similarly, the reliability of the connection between the UE 100 and the cellular network will be better than the case where the vehicle is moving at its cruising speed.

It should be noted here that although the data transmission and reception graph 465 shows the data rates changing in a step manner, in embodiments the changes may be more gradual. For example, in the transition between block 470 to block 475 (i.e. when the vehicle changes from moving slowly to stopping at a traffic light), the increase in data transmission may be more gradual. This may occur because as the vehicle approaches the proximity of the traffic light, the traffic light may communicate with the UE 100 telling the UE that it is approaching the IE. The UE 100 may then begin communicating with the IE 200 even if the vehicle is still moving. This means that the data transmission between the UE 100 and the IE may commence and, as the communication unit 110 may communicate over two separate networks simultaneously, the UE 100 may communicate with both the cellular network and the IE 200 at the same time. Additionally, it is envisaged that the UE 100 may perform broadband aggregation to allow the UE 100 to use both a cellular data link and a data link with the IE.

Moreover, during communication with the IE, the UE may inform the IE of its speed of movement. The speed can be derived in a known manner by the UE 100 using a GPS module (not shown) or other positioning sensors (not shown). The IE and the UE will then be able to communicate at a data rate appropriate for the speed.

For example, as the speed of the vehicle gradually slows as it approaches the traffic lights, the IE 200 may increase the transmission rate accordingly. This is because, as the speed of the vehicle reduces, the reliability of the connection between the UE 100 and the IE 200 increases. This means that an increase in transmission rate may be achieved. In some embodiments, therefore, the rate of data transfer between the UE 100 and the IE 200 will increase proportionally with the decrease in speed of the UE.

FIG. 5 shows a data structure which is stored within the data centre 305. The data structure may, in embodiments, be of the form of a database. The data structure associates various information with each UE 100. In the example of FIG. 5, and with reference to FIG. 3, the current location first UE 100A is noted as the first traffic light 315A. This is notified to the data centre 305 by the first IE 200A after the first UE 100A connects to it. As noted above, after connection, the first UE 100A notifies the IE 200A of its current speed. In this example, the first UE 100A is stationary and so its speed is 0km/h.

The data structure also associates the likely route of the first UE 100A with the first UE identifier. The likely route may be calculated by the first UE 100A using for example, its current location and historical information relating to the usual route taken by the vehicle at approximately the current time. This information may also be communicated to the IE 200A. For example, the vehicle may travel to the same destination at a similar time every day using the same route. An example of this would be a journey to a user's work or school. Alternatively or additionally, the likely route may be derived by the data centre 305 based on similar journeys taken by the first UE 100A in the past. Alternatively or additionally, the data centre 305 may determine the likely route because the data centre 305 knows the infrastructure available along road 320.

In the example of FIG. 5, the data structure associates the second traffic light 315B (and by association the second IE 200B) and the third traffic light 315C (and by association the third IE 200C) with the first UE 100A.

Additionally, the data to be transferred to the UE 100A is also stored in association with the UE identifier (or any information identifying the UE or a group of UEs) within the data structure. In this example, a firmware update is to be transferred to the first UE 100A. As the data to be transferred is a firmware update, a large amount of data must be transferred over a reliable connection. In other words, the firmware update is one example of data to be transferred over a high capacity, high reliable link.

Accordingly, in embodiments, the firmware update may be sent to the first IE 200A to be transmitted to the first UE 100A during the period of time that the first UE 100A is stationary and in communication with the first IE 200A.

It should be noted that although the data centre 305 may send the firmware to the first IE 200A for transmission to the first UE 100A, the entire firmware update may not be transferred to the first UE 100A before the first UE 100A begins to move again and thus transfers communication to the cellular network.

In this instance, the remaining Firmware update may be transferred to all other IEs along the likely route of the first UE 100A, which in this case, is the second IE 200B and the third IE 200C for storage in the storage medium 220.

Thus, when the first UE 100A connects to either the second IE 200B or the third IE 200C when stationary, the remaining Firmware update can be transferred to the first UE 100A.

In embodiments, rather than the remaining firmware being transferred to each of the IEs along the likely route, the remaining firmware may be transferred to only the next IE along the likely route. In the example of FIG. 3, therefore, the remaining Firmware would be transferred to only the second IE 200B. If there was any firmware update remaining after the first UE 100A communicated with the second IE 200B and the firmware update partially transferred, this remaining firmware update would be passed to the third IE 200C. By passing the remaining data to the next IE along the likely route, the data will be ready for transfer to the first UE 100A as soon as the connection between the first UE 100A and the second IE 200B and subsequently the third IE 200C occurs. This allows a larger amount of data to be transferred than waiting for the data to transfer from the data centre 305 to the respective IE before being transferred to the first UE 100A.

Alternatively, the data centre 305 may partition the data for transmission to the first UE 100A.

In this example, the data centre 305 knows the size of the firmware update. As the data centre also knows how long the vehicle will be stationary at each of the traffic lights along the route, and the approximate rate at which the data will be transferred between the respective IEs and the first UE 100A, the data centre 305 knows the likely amount of data that will be transferred between the respective IEs and the first UE 100A at each set of traffic lights.

The data centre 305 may then partition the firmware update into blocks of data each having a size less than the size of data that will be transferred between the IEs and the first UE 100A along the route. These blocks will then be sent by the data centre 305 to the respective IE 200 along the likely route. By performing the partition within the data centre 305, and then transferring only the relevant block to each IE along the likely route, the amount of data transferred around the network is reduced.

In the above where the UE 100 receives the data in this piecewise arrangement, the controller 105 is configured to assemble the data from each of the constituent parts so that it may be reconstructed by the UE 100.

Referring back to FIG. 5, each of the six UEs within FIG. 3 will stored in association with an identifier for the UE information similar to that stored in respect of the first UE 100A. Most of these are not shown for brevity. However, the information stored in association with the fourth UE 100D is shown. In this example, the current location of the fourth UE is shown as being between the first traffic light 315A and the second traffic light 315B. The exact location may be provided by the cellular network. Alternatively, if the data centre 305 cannot receive this information from the cellular network, the data centre 305 knows that the last location of the fourth UE 100D was the first traffic light 315A and that its likely route means that the next location will be the second traffic light 315B. Therefore, the data centre 305 will ascertain that the exact location of the fourth UE 100D is between the first traffic light 315A and the second traffic light 315B. Accordingly, the data centre 305 can send the data to be transferred to the fourth UE 100D to the second IE 200B for storage within the storage medium 215.

The current speed of the fourth UE 100D is not particularly relevant to the discussion of the disclosure. However, this information may be provided by the cellular network.

Finally, the data to be transferred to the fourth UE 100D is music and a 4K video stream. As, in particular, the 4K video stream is a very large file, it would be advantageous to transfer this over a reliable high bandwidth connection. Therefore, the fourth UE 100D will receive the 4K video stream over the IE system in the same manner as the firmware update.

It should be noted that the outstanding data may be data that is required by the UE, for example software updates, or may be data requested by a user, for example, a particular movie or the like. However, it is also possible that the outstanding data may be provided by a third party. For example, the outstanding data may be advertisements provided by a company to specific users of the UEs or may be traffic alerts for certain users, or social networking information or images from a user's security camera or other sensors. The security camera or other sensors may be mounted in a vehicle. The security camera or other sensors may be in communication with UE 100.

In a further embodiment, the UEs may all communicate with one another using the communication unit 110. This protocol is known as vehicle-to-vehicle (V2V) communication. However, in this example, each UE may share its connection with the IE and act as a hotspot. So, if the first UE 100A is too far from the first IE 200A to communicate with the first IE 200A, the first UE 100A will communicate with the second UE 100B. The second UE 100B will then act a relay for the first UE 100A to communicate with the first IE 200A. If, on the other hand, the second UE 100B is also too far from the first IE 200A, the second UE 100B will communicate with the third UE 100C. The third UE 100C will then act as a relay for both the first UE 100A and the second UE 100B and will communicate with the first IE 200A. This arrangement may be reconfigurable in for example slow moving traffic. A fourth UE may become relay for UEs 100A, 100B, 100C. The vehicles need not be adjacent each other in a queue. In some embodiments, UE 100B may be out of range of the fourth UE because for example it is in a tunnel. The fourth UE may act as a relay from the IE 200A to UE 100A and UE 100A may itself act as a relay to UE 100B. In slow moving traffic with a proportion of traffic moving in much the same direction, the relay configurations could be stored and attempts made at reconnection of a same or similar network of UEs when UEs reach a next IE. Of course other UEs could join. The arrangement of the network including the relay to the IE may be dynamic.

In this instance, when the third UE 100D is acting as a relay for other UEs, the first IE 200A may selectively provide data to the third UE 100D. For example, the first IE 200A may provide the data for one of the other relays first before providing the third UE 100D with its data. In other words, the first IE 200A prioritises the data it provides to the relay UE. This prioritising of data may be done on the basis of age of outstanding data (so for example, old data will be serviced first), urgency of data (so for example, urgent software updates are serviced first), or if a user of a relay UE has paid a subscription to expedite data.

Additionally, as the IE knows the number of UEs in the queue, the communication unit 210 may perform antenna beam forming along the length of the queue to increase the range of the IE to reach more UEs located in the queue. The power of the signal radiated from the antenna is reduced to the sides of the queue but effectively amplified along the length of the queue to avoid servicing locations where a UE is unlikely to be present.

Additionally, in some embodiments in the case of this relay arrangement, the first IE 200A knows the identity and number of the UEs waiting at the traffic lights. This information can be fed back to the data centre 305 and provides useful live traffic information. This is because for each set of traffic lights, the data centre 305 will know how many vehicles are queuing. The traffic light sequence may be altered according to this live traffic information. Moreover, this information may be provided to real-time traffic alerts (i.e. upto date or live traffic alert) which are sent to the emergency services and users of satellite navigation systems or other subscribers. This gives a detailed understanding of traffic levels at each set of traffic lights.

Moreover, as the first IE 200A knows the identity of each UE, the first IE 200A can determine how long each UE queues for at the first traffic light 315A. This again provides useful traffic information. Further, in the event of the first traffic light 315A being a temporary traffic light put in place to allow maintenance or construction to take place, the data centre 305 will know the identity of the UE and the duration of time for which the user of the UE was inconvenienced. This will allow compensation to be provided to the user such as a discount voucher. This may be transferred to the UE when the UE connects to the IE or later. It may be transferred when the user is inconvenienced on subsequent occasions. In some embodiments that may be when the UE connects to the IE at the same location on a subsequent occasion.

Although the foregoing has noted traffic lights as appropriate street furniture, the disclosure is not so limited. For example, similar principles may apply to street furniture such as a parking meter. In this instance, as the user pays in advance for parking, the IE knows the duration for which the UE will be stationary. Accordingly, after connecting to the IE, the data centre 305 can determine how much data can be transferred to the UE and transfer the data to the IE according to the principles set out above.

Figure 6:
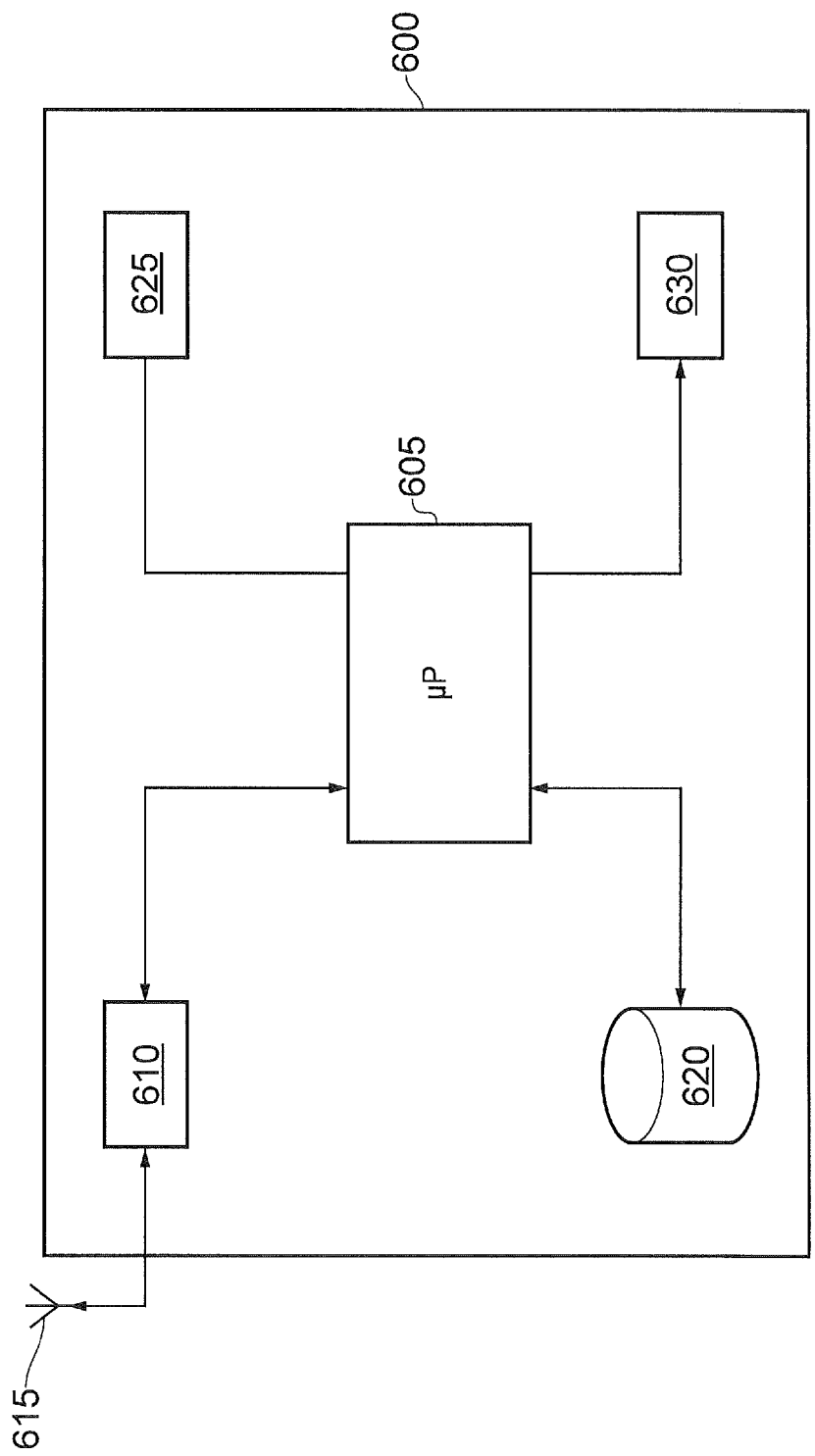
FIG. 6 schematically illustrates wearable technology according to embodiments.

In embodiments a smart display is provided. The smart display may be a head-up display located within a vehicle, smart glasses, contact lenses allowing augmented reality display or goggles providing an augmented reality display (for example skiing goggles). An embodiment of a smart display 600 is provided in FIG. 6.

The operation of the smart display (SD) 600 is controlled by a controller 605. The controller 605 may take the form of a controller circuitry which is typically made of semiconductor material and which runs under the control of computer software embodied as computer readable code. This code may be stored within the controller 605 or may be stored elsewhere within the SD 600. In this specific example, the computer software is stored within storage medium 620 which is connected to the controller 605. Storage medium 620 may be formed of any kind of suitable media such as solid-state storage or magnetic or optical readable media. Other data such as user profile information, application data, and content is also stored on storage medium 620.

Also connected to controller 605 is a communication unit 610. The communication unit 610 may take the form of communication circuitry which is configured to communicate data to and from the UE 600. In embodiments, the data may be communicated wirelessly using a local area of near-field network such as Wi-Fi (802.11a-n) or Bluetooth or on a point-to-point basis or the like. Indeed, it is envisaged that the communication unit 110 may contain several modules which allows the UE 100 to communicate over various networks and point-to-point systems at the same time. The communication unit 610 may communicate with a cellular network using 3G, LTE or 5G or the like.

The communication unit 610 is connected to an antenna 615 which allows this data to be communicated wirelessly.

The controller 605 is also connected to a user input module 625. The user input module 625 may be a touchscreen, stylus, keyboard, mouse, gesture recognition system or any kind of device suitable to allow the user to control the operation of the SD 600.

The controller 605 is also connected to a user output module 630. The user output module 630 may be a display (either integrated with the SD 600 such as a glasses lens or contact lens or may be separate to the SD 600 such as a vehicle head-up display), or any kind of device suitable to allow the user to receive the output of the SD 600.

The operation of the SD 600 will now be described.

In embodiments, when the SD 600 is operational content is displayed to the user. This content may be stored in the storage medium 620 or may be received via the communication unit 610. The content may include traffic information received from the data centre 305. The user may opt to also have some or all of the content provided in audio form using text to speech translation.

As the user approaches the traffic light set out in the previous embodiments, in addition to or in replacement of the data being provided to the UE 100 via the IE 200, the SD 600 may receive data for display to the user on its user output module 630. This information may be entertainment content such as a video snippet or may be content associated with the locality or the journey. For example, the content may be a traffic update about the journey or may be a live video stream of traffic along the route. Alternatively, this content may be a graphic illustrating the route with areas of congestion highlighted and alternative routes suggested.

It is important to note here that as the user is stationary, almost stationary or travelling below a predetermined speed, it is envisaged that not only can large amounts of content be provided to the user, but the user output module 630 may display large amounts of data as the user does not need to see their real-life surroundings and so can concentrate on the displayed data.

However, when the traffic lights change to proceed, this is indicated to the SD 600 by the traffic light. The controller 605 of the SD 600 then operates in a second mode which provides less content to the user. In other words, as the user is moving again, the user will need to concentrate on his or her surroundings for safety. The amount of content, therefore, showed to the user on the SD 600 is reduced in this mode of operation. To put it another way, the amount of content showed to the user is an abridged version in this mode of operation. However, it is envisaged that content will still be shown. So, for example, in the case of the first mode of operation (when the vehicle is stationary, almost stationary or travelling below a predetermined speed, and large amounts of content are provided to the SD 600), the entirety of the remaining route with traffic information may be shown to the user and in the event of there being an incident, an alternative route is shown. However, when the SD 600 switches to the second mode of operation (for example the vehicle moves again), only the next step in the alternative route is shown, for example a turn right or turn left at the next intersection. Indeed, a graphic may be displayed in the abridged content rather than large amounts of content. This reduced content enables the user to obtain useful information without compromising safety and whilst appreciating the bandwidth limitations of the cellular network compared with the near-field network of the IE 200. In the second mode of operation, data from the first mode of operation (for example some detailed instruction) may be rendered as audio information, for example read out by a Text to Speech (TTS) processor.

In addition, where the SD 600 has a camera (not shown) to capture the view of the user, the SD 600 may switch between the first mode of operation and the second mode based on the number of objects in view. For example, where there are few or no objects in view, the SD 600 will operate in the first mode. However, where there are a number of objects in view (for example a number over a threshold), then the SD 600 will operate in the second mode of operation. This ensures that the user is not distracted.

In another scenario, any of the embodiments described may also receive information from the emergency services. In this scenario, the emergency services responding to an emergency will inform the data centre of the route of the emergency vehicle. In this instance, where the identity of the patient is known, the medical records may be the content provided to the UE 100 or the SD 600 by the IE 200 along the route to the emergency. In addition, all vehicles along the route will be informed that an emergency vehicle will pass through so that the other drivers may take evasive action as required.

Although the foregoing has been described with the UE 100 and the SD 600 receiving data from the IE 200, the disclosure is not limited to this. For example, in other embodiments, the UE 100 and the SD 600 may provide data to the IE 200. So, if the UE 100 and/or the SD 600 capture an image of a traffic accident or traffic congestion using a built in camera, this may be transferred to the data centre 305 using the IE 200 when the vehicle is stationary. Indeed, the UE and SD may transfer only low resolution or key-frames over the cellular network and wait until the UE and/or SD is in communication with the IE 200 over the higher bandwidth network before a high resolution image or video stream is transferred.

In the above, although the street furniture indicates to the UE 100 or the SD 600 that the vehicle is stationary (i.e. that the traffic light is red in the specific example), the disclosure is not so limited. For example, the UE 100 or the SD 600 may determine when it is stationary by measuring its GPS position or using its accelerometer or gyroscopes.

Figure 7:
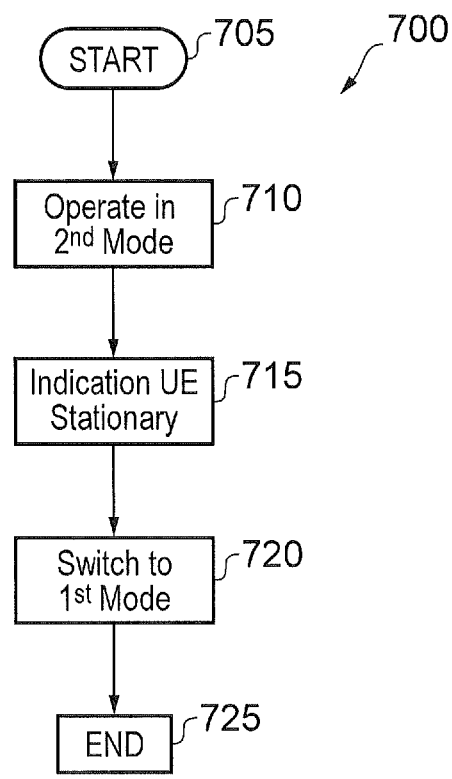
FIG. 7 shows a flow chart explaining a process in the User Equipment of FIG. 1.

FIG. 7 shows a flow diagram explaining the operation of the UE 100. The process 700 starts in step 705. The UE 100 operates in the second mode in step 710. As noted above in some embodiments, the second mode has a lower bandwidth than the first mode and may be, for example, a cellular network. In step 715 there is an indication that the UE 100 is stationary. This may be an indication from a traffic light that a stop sign is given or may be determined from the UE's own sensors such as GPS or accelerometer sensor. The UE 100 then operates in the first mode in step 720. In the first mode, the UE 100 may operate in a higher bandwidth mode than in the second mode and will communicate with IE 200. The process ends in step 725.

Figure 8:
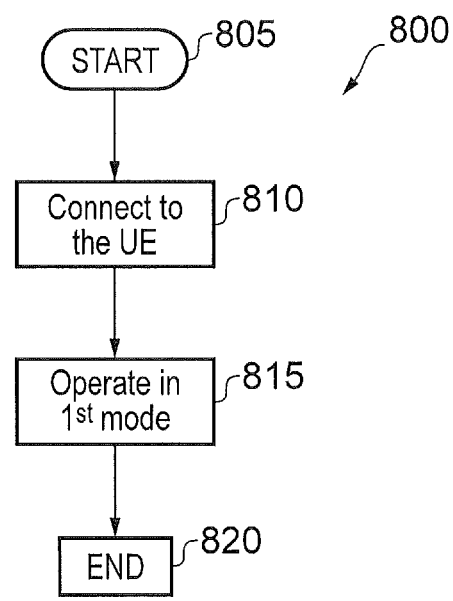
FIG. 8 shows a flow chart explaining a process in the Infrastructure Equipment of FIG. 2.

FIG. 8 shows a flow diagram explaining the operation of the IE 200 in communication with the UE 100. The process 800 starts at step 805. The IE 200 then connects, using the controller 205, with the UE 100 in step 810. This is a known process. However, when the UE 100 is stationary, for example when the IE 200 is notified by a traffic light that it has turned red to stop traffic, the IE 200 operates in the first mode with the UE 100. This is step 815. Then, when the UE 100 is not stationary, for example if the traffic light changes to proceed, the IE 200 stops communicating with the UE 100 and the process ends in step 820.

Figure 9:
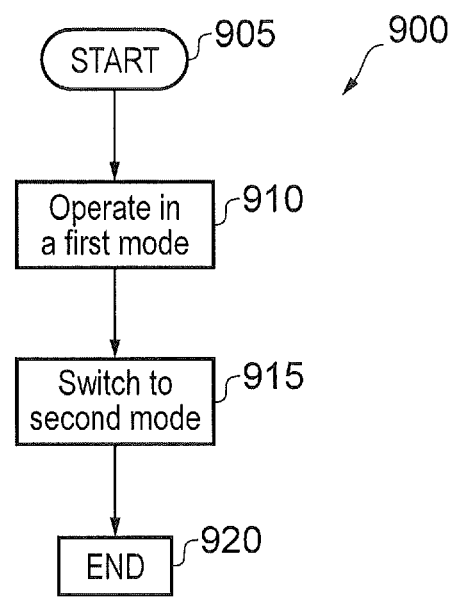
FIG. 9 shows a flow chart explaining a process in the wearable technology of FIG. 6.

FIG. 9 shows a flow diagram explaining the operation of the wearable technology 600. The process 900 starts in step 905. The wearable technology operates in a first mode 910 where data transferred to the wearable technology 600 is displayed on a full screen. This may occur when the wearable technology is stationary and/or when the view of the user only has a small number of objects. When the wearable technology begins to move and/or has more objects in its view, the wearable technology switches to operate in a second mode in step 915. The process ends in step 920.

In the above, 4K video streams are only an example. Higher or lower resolution video streams are possible. Video streams may represent movies for providing entertainment to passengers in the vehicle. They may represent live or near live content such as security camera footage or traffic conditions at one or more locations. Video streams of traffic conditions may be streamed and correspond to planned or alternative locations along a route that is intended to be followed. In embodiments video streams may comprise still images or sequences of still images.

Further Embodiments

As noted above, the data transmitted from the IE 200 may be entertainment information. For example, the entertainment information may be video and/or audio data. It should be noted here that the type of data is not limiting; the embodiments are applicable to any kind of streamed or time critical data. However, for ease of explanation, the following will refer to content data which means any kind of audio and/or video data, but could also apply to any kind of streamed or time critical data.

Providing content can be problematic to a vehicle or any kind moving device (such as a handheld display). This is because streaming audio and/or video data requires a reliable connection to a network to avoid the content stopping during replay due to insufficient data being stored in a buffer. This is called buffer underrun. Such underrun may occur if there is an unreliable connection or handover between networks or infrastructure equipment is unreliable or disturbed.

One method to address this is to download the content onto the playback device and playback the content downloaded onto the device. However, this requires a large amount of storage within the playback device. In embodiments, content rights issues need to be considered to prevent transfer to other storage media. Also, rights may need to be revoked or suspended. This may be due to changes in licensing of the content or undesirable activities by users or hardware; such activities may be copyright infringing activities. Suspension of rights may be needed when a user allows a service subscription to lapse.

Further, as the content is downloaded to a playback device taken outside of the home network, this may breach a license which only allows streaming content to be played back on the device.

In embodiments, it is desirable to give a user experience which feels like uninterrupted streaming without buffer underrun in an environment where there are multiple handovers between different IEs. In other words, it is desirable to give a user experience which feels like streaming whilst not connected to a reliable network connection. These further embodiments aim to address this issue. Whilst these further embodiments aim to solve a specific problem, the skilled person will appreciate that these further embodiments can be combined into the embodiments described with reference to FIGS. 1 to 9.

Broadly speaking, this issue is addressed by the UE 100 downloading from the IE the content to be reproduced before the UE 100 reaches the next IE. In other words, the UE 100 predicts the content that will be consumed in the time taken to reach the next IE. The downloading may be for a portion of a content item. The portion may be defined by chapter markers in the content. The portion may be an appropriate number of fragments of a file representing the content depending on when the UE 100 reaches or is likely to reach the next IE. In the case of video, the portion may start with a fully encoded frame, a so called i-frame. Of course the fragments may be files themselves. When the portion of the content items has been played back or otherwise consumed, it may be deleted to free up space in the buffer. Some fragments or portions may be retained to allow a user for example to rewind video, for example, up to 30 minutes in the case of video. In embodiments, fragments or portions may be retained so long as there is sufficient storage space. Storage space is monitored and when there risks being insufficient storage space, fragments or portions that are furthest in time from a current playback position are deleted or overwritten by incoming fragments or portions.

Figure 10:
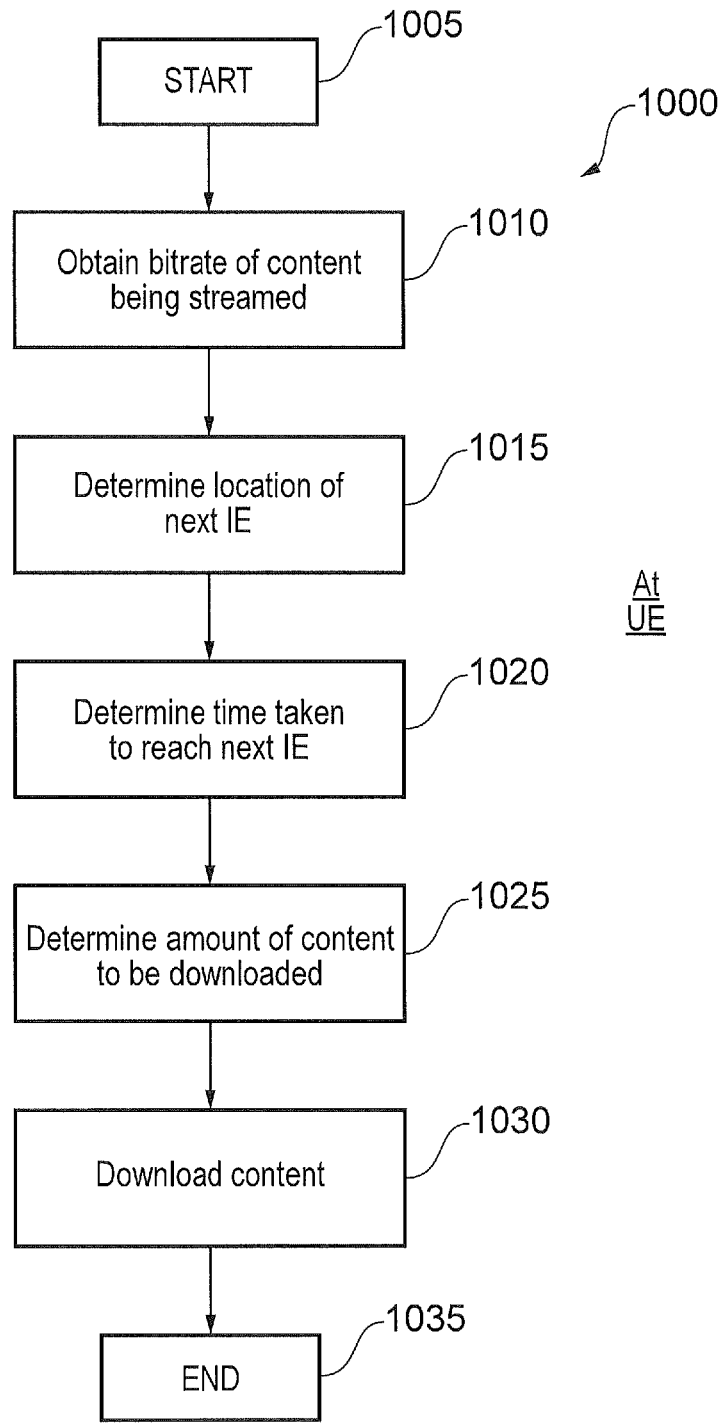
FIGS. 10 and 11 show flow charts explaining a process according to further embodiments.

Referring to FIG. 10, an embodiment of this disclosure is shown. Specifically, a process 1000 explaining the embodiment carried out in the UE 100 is shown. The process 1000 starts at step 1005. The process moves to step 1010.

In step 1010, the UE 100 obtains the bitrate or an indication or data representation of the bitrate of the content being streamed. This may be obtained using any known technique. For example, where the content being streamed is compliant with MPEG-DASH (MPEG-Dynamic Adaptive Streaming over HTTP), the bitrate may be obtained from the DASH Media Descriptor.

The process then moves to step 1015. In step 1015, the location of the next IE is determined. This location information may be obtained from the IE from which content is currently being streamed. Alternatively, the location information may be obtained from the positioning system within the UE 100 which may include route information associated with the UE 100 (i.e. the route the UE 100 will take) or the like.

The process then moves to step 1020. In step 1020, the time taken to reach the next IE is determined. This time may be determined by calculating the distance to the next IE and using a predicted speed of movement of the UE 100 to calculate the predicted time to reach the next IE. The predicted speed may include current traffic information along the route to the next IE. Therefore, in heavy traffic, the speed may be slower which means that the amount of time required to reach the next IE may be greater.

The process then moves to step 1025. In step 1025, the amount of content to be downloaded to the UE 100 is determined. This may be calculated as the product of the bitrate and the time taken to reach the next IE. It is envisaged that more content than that calculated may be downloaded. This may take into account traffic fluctuations or driver behaviour. For example, the driver may drive more slowly than the speed limit which would increase the time in reaching the IE. Therefore, the amount of content determined in step 1025 may be given an increase of, say, 5% to account for this. It is envisaged that the UE's previous behaviour may be used in determining this increase. For example, if the UE typically travels more slowly than the speed limit, then the increase may be adjusted accordingly.

The process then moves to step 1030. In step 1030, the determined amount of content is downloaded onto the UE 100 from the IE.

The process ends at step 1035.

It is further envisaged that the UE 100 may monitor the use of the content during the journey from the IE from which content is downloaded to the next IE. This is discussed with reference to the flowchart 1100 in FIG. 11.

Figure 11:
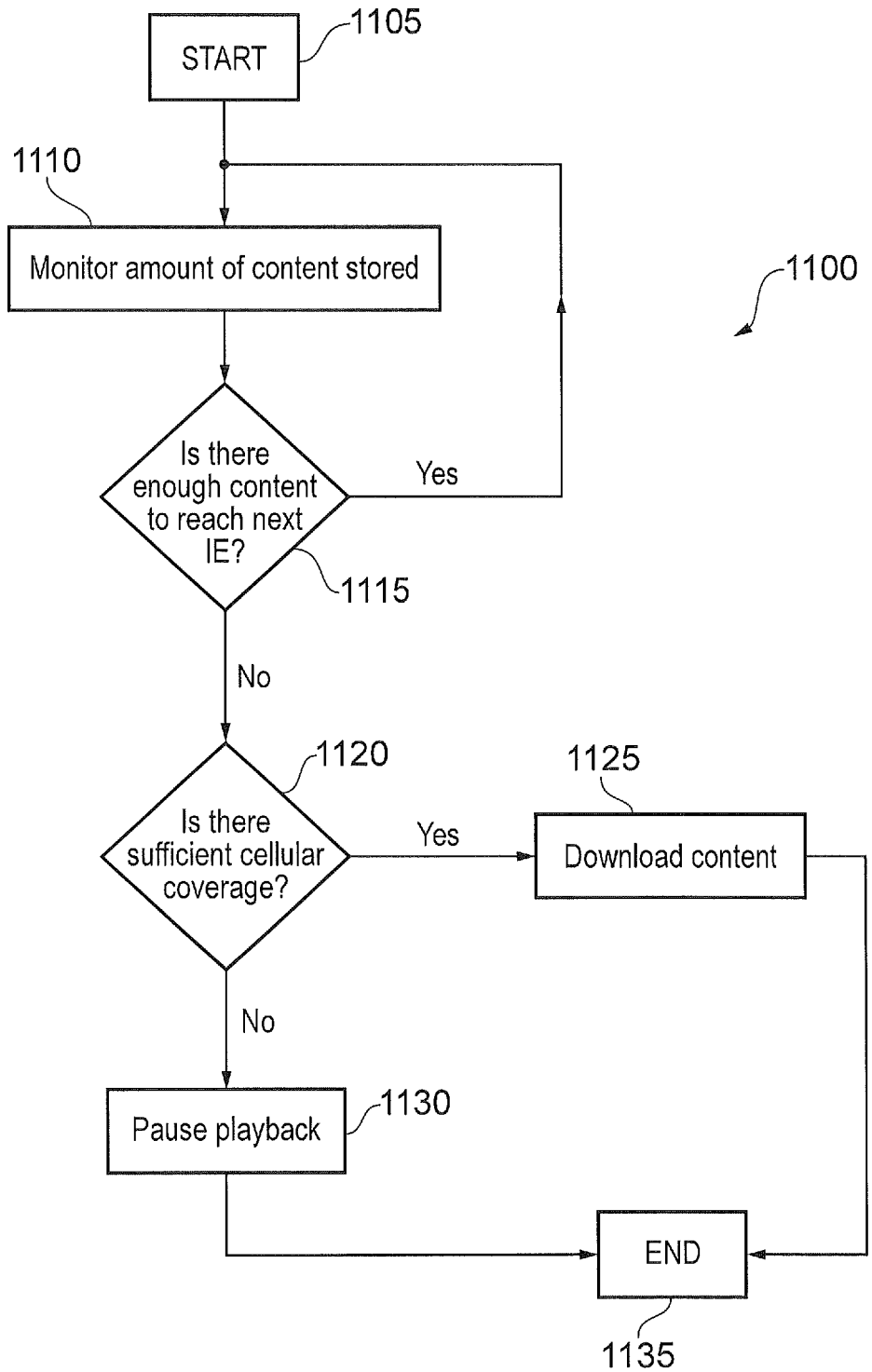

It is envisaged that the process of FIG. 11 commences after the UE 100 has stopped downloading content from the IE and is not in contact with the next IE.

The process starts at step 1105. The process then moves to step 1110. In step 1110, the amount of unused stored content is monitored. In other words, the amount of content buffered to reach the next IE and stored within the UE 100 is determined.

The process moves to step 1115 where the UE 100 determines whether there is enough buffered content within the UE 100 to reach the next IE. In order to achieve this, the distance between the current location of the UE 100 and the next IE is determined. From this information, and the speed the UE 100 is moving, it is possible to determine the time before the UE 100 reaches the next IE. As the bitrate of the downloaded content is known, the amount of buffered content required within the UE 100 to reach the next IE may be determined. This calculated amount is compared with the stored amount. In the event that there is enough content the "yes" path is followed back to the start of step 1115. In other words, if the amount of buffered content is at or above the calculated amount, the "yes" path is followed.

In the event that there is not enough buffered content, the "no" path is followed to step 1120. In other words, if the amount of buffered content is below the calculated amount, the "no" path is followed.

In step 1120, cellular coverage is checked by the UE 100 to see if data download is possible. In other words, the UE 100 checks to see if content may be downloaded using another network. For example, the other network may be a cellular network such as a 3G or LTE or other type of network such as a WiFi or WiFiMax network. This may mean that the UE 100 enters a so-called "sniff mode" where the UE looks for alternative cellular networks or other networks such as WiFi networks stored in the memory in step 1120 so that the UE 100 can find an alternative network. Basically, the UE 100 checks to see if content data may be downloaded using a different mechanism to that of the IEs.

If the UE 100 may download the content using a different network such as a cellular network or a WiFi network, the "yes" path is followed to step 1125. On the other hand, if the UE 100 cannot download the content using a different network, the "no" path is followed to step 1130.

If the "no" path is followed to step 1130, the playback of the content is paused. It is envisaged that prior to pausing the playback, the user may be informed that playback is about to stop. A countdown may be shown to the user prior to pausing the playback so that the user can prepare themselves for the content playback stopping. Additionally, this countdown may prompt the user to alter their driving habits to reach the next IE more quickly, for example, by taking a shorter route or the like. After pausing playback, the process ends at step 1135.

It is possible, although not shown, that the process may return to step 1110 instead of step 1135. In this case, the amount of buffered content is monitored so that after a certain amount of pause, it is possible that the amount of buffered content then exceeds the amount of content required to reach the next IE.

Returning back to step 1125, rather than waiting for the next IE, the content may instead be downloaded (and streamed or stored in the buffer) using the different network. It may be that the content may be downloaded at a lower bitrate to ensure that the different network can stream the content, or to ensure that the UE 100 does not exceed any data cap applied by the different network. Of course, the disclosure is not so limited and the content may be downloaded over the different network at the same bitrate as over the IE. Indeed, the user may define the bitrate to be used when downloading content over the different network.

The process then ends at step 1135. Again, it is possible, although not shown, that the process may return to step 1110 instead of step 1135. This would ensure that if there is any further shortage of content, this can be replenished using the different network. The different network may be a roaming WiFi network such as BT-FON or the like.

These further embodiments have a number of advantages. Firstly, by downloading only content required between IEs, the backhaul of the infrastructure may be reduced. This reduces cost and complexity of the system. This is particularly useful in high traffic conditions where a large number of users try to access the IEs at approximately the same time. By downloading only the required content will reduce the burden on the infrastructure.

Additionally, the user is more likely to enjoy uninterrupted viewing without large amounts of additional storage required. Finally, there is equitable sharing of the IE resource between users of the IE.

Referring to FIG. 12, a timing diagram illustrating the flow chart of FIG. 10 is shown. The timing diagram shows the amount of buffer filled with respect to the playback position on the ordinate and time along the abscissa. Additionally, there are three buffer levels shown on the ordinate; A, B and C. In level A, the minimum amount of data in the buffer is shown. This is the state where buffer under-run takes place. This level may be zero or some other appropriate amount. In level B, this is the amount of data in the buffer which is satisfactory for streaming Finally, level C is the amount of data in a full buffer.

Referring to FIG. 12, the UE 100 downloads the content using IE 200A during time 1201. The amount of content to be downloaded is sufficient to allow playback in real-time at a given bitrate whilst the UE 100 travels to the second IE 200B. The download rate is therefore faster than the rate at which content is played back in real-time. Real-time for entertainment content is real-time by virtue of the time base of the requested playback rate.

At time 1201, the UE 100 stops communicating with IE 200A. Then, the UE 100 begins to consume the content stored in the buffer whilst the UE 100 travels to the second IE 200B. The UE 100 travels towards IE 200B during time 1210. This results in a linear consumption of the content in the buffer.

As the UE 100 begins to communicate with the second IE 200B, the buffer again fills with content. This content is provided by the second IE 200B and is sufficient to allow the UE 100 to reach the third IE 200C. In this case, the third IE 200C is further from the second IE 200B than the second IE 200B is from the first IE 200A. This means that the UE 100 fills the buffer with content during time period 1202. In order to provide sufficient content, the bitrate of the content supplied by the second IE 200B may be higher than that provided by the first IE 200A or the time period 1201 may be less than time period 1202.

The UE 100 then travels between the second IE 200B and a third IE 200C. This travelling occurs during time period 1220. As is evident from FIG. 12, the UE 100 arrives at the third IE 200C as the buffer empties of content.

Referring to FIG. 13 a timing diagram illustrating the flow chart of FIG. 11 is shown. It should be noted that FIG. 13 is similar to FIG. 12 with a slight difference. Specifically, in FIG. 13, as the UE 100 travels between the first IE 200A and the second IE 200B, the movement of the UE 100 is delayed. This means that during step 1115 of FIG. 11, the UE 100 determines there is not enough content to continue playback. Accordingly, the UE 100 follows the "no" path to step 1120 in FIG. 11 and the content is streamed over the cellular network (or a different network) instead of being consumed from the buffer during period 1303. This results in the content stored in the buffer remaining substantially flat until the UE 100 begins communicating with the second IE 200B.

The remaining reference numerals are identical to those of FIG. 12 and so will not be described in any detail for brevity.

The above description in relation to FIGS. 10 to 13 download content prior to disconnection from a network so that real-time playback may occur whilst the UE is disconnected from the network. In other words, a mechanism is described which allows streaming playback of content whilst the UE is disconnected from a network. This means that from a content subscription point of view, the user may have a streaming subscription but may still utilise this service. This is because the content that is downloaded is only to ensure streaming may occur between IEs. In order to further supplement this, if the UE arrives at the next IE prior to the buffer being emptied, the UE may erase the remaining content from the memory. This will ensure that the downloaded content is only ever used to provide real-time playback as the UE travels between IEs.

Generally, therefore, the above mechanism provides a streaming subscription service where content data is provided to a mobile device from first infrastructure equipment and second infrastructure equipment and the service determines the amount of content data required to reproduce in real-time when the mobile device moves between communicating with the first infrastructure equipment and the second infrastructure equipment; and the mobile device downloads the amount of content data from the first infrastructure equipment. Optionally, the service may require the mobile device to delete any remaining content data before communicating with the second infrastructure equipment.

Further Embodiments of the Disclosure

A method comprising:
granting first permissions to stream audio and/or video content from a server to the buffer memory of a client device
in addition granting second permissions to downloads of portions of the same audio and/or video content from a server to the buffer memory of a client device
the audio and/or video content being protected by digital rights management instructions associated with the audio and/or video content and preventing the audio and/or video content from being played back on a different client device.

The method may further comprise:
streaming audio and/or video content or downloading portion of the audio and/or video content depending upon an identification of a type of infrastructure node through which access to the audio video content is requested.

The method may yet further comprise the first and second permissions being part of a same licensing offer, for example a subscription.

The type of infrastructure node may for example be that of a cellular network and permitting internet access or may be IE as described previously, for example incorporated into street furniture.

A server comprising circuitry configured to
identify of a type of infrastructure node through which access to the audio video content is requested based on node identification data received via an interface
verify that a licensing offer allows stream of and download of portions of audio and/or video content.
stream audio and/or video content to the buffer memory of a client device if the node identification data is of a first type
allow download of portions of the same audio and/or video content from a server to the buffer memory of a client device if the node identification data is of a second type.

The server embodiment may further comprise the audio and/or video content being protected by digital rights management instructions associated with the audio and/or video content and preventing the audio and/or video content from being played back on a different client device.

A compatible client device is also within the scope of the disclosure. It may comprise circuitry configured to interact with an infrastructure node and request access to the audio and/or video content through an interface from a server.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the present technique can generally described by the following numbered clauses:

1. User equipment comprising communication circuitry configured to communicate data with infrastructure equipment and controller circuitry configured to:
   operate in a first mode using a first communication protocol and operate in a second mode using a second communication protocol, wherein the first communication protocol has a higher bandwidth than the second communication protocol; and
   switch operation from the second mode to the first mode when the user equipment is at or below a threshold speed.
2. User equipment according to clause 1, wherein the threshold speed is stationary.
3. User equipment according to clause 1 or 2, wherein the communication circuitry is configured to receive a signal from street furniture indicating that the user equipment is at or below the threshold speed.
4. User equipment according to clause 3, wherein the street furniture is a traffic light.
5. User equipment according to any preceding clause wherein the communication circuitry is configured to receive a first type of data in the first mode and a second type of data in the second mode.
6. User equipment according to clause 5, wherein the second type of data includes firmware updates and/or real-time content.
7. User equipment according to any preceding clause, wherein the communications circuitry is configured to receive the data in blocks and the controller circuitry is configured to reconstruct the data from the constituent blocks.
8. User equipment according to any preceding clause, wherein the communication circuitry is configured to communicate with second user equipment and to act as a relay between the infrastructure equipment and the second user equipment.
9. User equipment according to clause 1 or 2, wherein the controller circuitry is configured to determine the speed of the user equipment.
10. User equipment according to any preceding clause wherein the first communication protocol has a shorter effective range than the second communication protocol.
11. Infrastructure equipment comprising communication circuitry configured to communicate data with the user equipment according to any preceding clause, and controller circuitry configured to:
   operate in the first mode when the user equipment is stationary.
12. Infrastructure equipment comprising: communication circuitry configured to communicate data with user equipment;
   interface circuitry configured to receive information defining the status of an indicator in a network of signalling indicators, wherein the communication circuitry is further configured to initiate a connection with the user equipment depending on the received information defining the status of the indicator, the status anticipating that the user equipment is travelling at or below a threshold speed.
13. Infrastructure equipment according to clause 11 or 12, wherein the communication circuitry is configured to transmit a signal to the user equipment indicating that the user equipment is stationary.
14. Infrastructure equipment according to any one of clauses 11 to 13 wherein the communication circuitry is configured to transmit a first type of data in the first mode and a second type of data in the second mode.
15. Infrastructure equipment according to clause 14, wherein the second type of data includes firmware updates and/or real-time content.
16. Infrastructure equipment according to any one of clauses 11 to 15, wherein the data is formed from constituent blocks and the communication circuitry is configured to receive a constituent block of data from a control device and to transmit the constituent block of data to the user equipment.
17. Infrastructure equipment according to any one of clauses 11 to 16, wherein the communication circuitry is configured to communicate data for second user equipment to the user equipment.
18. A control device connectable to a plurality of infrastructure equipment of clause 16, comprising a controller configured to obtain the data for transmission by the infrastructure equipment and to derive the constituent blocks based on the number of infrastructure equipment.

19. A smart display comprising communication circuitry configured to receive data, a display device to display the received data and controller circuitry configured to:
   operate in a first mode wherein the received data is displayed in full on the display device and operate in a second mode wherein the received data is displayed in an abridged format; and
   switch operation from the first mode to the second mode when the smart display is travelling at or below a threshold speed.

20. A smart display according to clause 19, wherein the controller circuitry is configured to convert the received data not displayed in the abridged format into audio, and to provide the audio to a speaker.

21. A smart display according to clause 19, wherein the controller circuitry is configured to convert the received data not displayed in the abridged format into a graphic, and to display the graphic on the display device.

22. Wearable technology comprising a smart display according to any one of clauses 19 to 21.

23. A system comprising user equipment according to clause 1 in communication with infrastructure equipment according to clause 11 or 12.

24. A method of controlling user equipment, the user equipment comprising communication circuitry configured to communicate data with infrastructure equipment and controller circuitry, the method comprising:
   operating in a first mode using a first communication protocol and operate in a second mode using a second communication protocol, wherein the first communication protocol has a higher bandwidth than the second communication protocol; and
   switching operation from the second mode to the first mode when the user equipment is at or below a threshold speed.

25. A method according to clause 24, wherein the threshold speed is stationary.

26. A method according to clause 24 or 25, comprising receiving a signal from street furniture indicating that the user equipment is at or below the threshold speed.

27. A method according to clause 26, wherein the street furniture is a traffic light.

28. A method according to any one of clauses 24 to 27 comprising receiving a first type of data in the first mode and a second type of data in the second mode.

29. A method according to clause 28, wherein the second type of data includes firmware updates and/or real-time content.

30. A method according to any one of clauses 24 to 29, comprising receiving the data in blocks and the controller circuitry is configured to reconstruct the data from the constituent blocks.

31. A method according to any one of clauses 24 to 30, comprising communicating with second user equipment and to act as a relay between the infrastructure equipment and the second user equipment.

32. A method according to clause 24 or 25, comprising determining the speed of the user equipment.

33. A method according to any one of clauses 24 to 32 wherein the first communication protocol has a shorter effective range than the second communication protocol.

34. A method of operating infrastructure equipment comprising communication circuitry configured to communicate data with the user equipment according to any one of clauses 1 to 10, the method comprising:
   operating in the first mode when the user equipment is stationary.

35. A method of operating infrastructure equipment comprising communication circuitry configured to communicate data with user equipment; the method comprising:
   receiving information defining the status of an indicator in a network of signalling indicators, and initiating a connection with the user equipment depending on the received information defining the status of the indicator, the status anticipating that the user equipment is travelling at or below a threshold speed.

36. A method according to clause 34 or 35, comprising transmitting a signal to the user equipment indicating that the user equipment is stationary.

37. A method according to any one of clauses 34 to 36 comprising transmitting a first type of data in the first mode and a second type of data in the second mode.

38. A method according to clause 37, wherein the second type of data includes firmware updates and/or real-time content.

39. A method according to any one of clauses 34 to 38, wherein the data is formed from constituent blocks and the communication circuitry is configured to receive a constituent block of data from a control device and to transmit the constituent block of data to the user equipment.

40. A method according to any one of clauses 34 to 39, comprising communicating data for second user equipment to the user equipment.

41. A method of operating a smart display comprising communication circuitry configured to receive data and a display device to display the received data, the method comprising:
   operating in a first mode wherein the received data is displayed in full on the display device and operate in a second mode wherein the received data is displayed in an abridged format; and
   switching operation from the first mode to the second mode when the smart display is travelling at or below a threshold speed.

42. A method according to clause 41, comprising converting the received data not displayed in the abridged format into audio, and to provide the audio to a speaker.

43. A method according to clause 41, comprising converting the received data not displayed in the abridged format into a graphic, and to display the graphic on the display device.

44. Non-transitory storage medium configured to store computer readable code, which, when loaded onto a computer, configures the computer to perform a method according to any one of clauses 24 to 43.

45. User equipment according to claim 1, wherein the communication circuitry is configured to communicate content data with the infrastructure equipment and second infrastructure equipment and the controller circuitry is configured to:
   determine the amount of content data required to reproduce in real-time when moving between communicating with the infrastructure equipment and the second infrastructure equipment; and
   download the amount of content data from the infrastructure equipment.

46. User equipment according to clause 45, wherein when moving between the infrastructure equipment and the second infrastructure equipment, the controller circuitry is configured to reproduce the content data;
   monitor the amount of non-reproduced downloaded content data; and when the amount of remaining downloaded content data is at or below a threshold value, the communication circuitry is configured to download further content data over a further network.

47. User equipment according to clause 46, wherein the further network is a cellular network.

48. User equipment according to clause 46, wherein the further content data is at a bitrate less than the content data downloaded from the infrastructure equipment.

49. User equipment comprising communication circuitry configured to communicate content data with first infrastructure equipment and second infrastructure equipment and controller circuitry configured to:
 determine the amount of content data required to reproduce in real-time when moving between communicating with the first infrastructure equipment and the second infrastructure equipment; and
 download the amount of content data from the first infrastructure equipment.

The invention claimed is:

1. A user equipment comprising:
 communication circuitry configured to communicate data with infrastructure equipment and controller circuitry configured to:
  operate in a first mode using a first communication protocol and operate in a second mode using a second communication protocol, wherein the first communication protocol is a cellular protocol having a lower bandwidth than the second communication protocol, and
  switch operation from the first mode to the second mode when the user equipment is at or below a threshold speed of movement of the user equipment and is within a range from fixed infrastructure equipment operating using the second communication protocol, wherein the communication circuitry is configured to receive a first type of data in the first mode and a second type of data in the second mode, whereby the second type of data includes content data comprising firmware updates and/or real-time content,
 wherein the controller circuitry is further configured to:
  determine an amount of the second type of data required to reproduce in real-time when the user equipment is moving,
 download the amount of the second type of data,
 monitor an amount of non-reproduced downloaded data of the second type of data during reproduction of the second type of data, and
 when the amount of remaining non-reproduced downloaded data of the second type of data is at or below a threshold value, download additional second type of data.

2. The user equipment according to claim 1, wherein the user equipment is at the threshold speed and the threshold speed of movement of the user equipment is stationary.

3. The user equipment according to claim 1, wherein the communication circuitry is configured to receive a signal from street furniture indicating that the user equipment is at or below the threshold speed of movement of the user equipment.

4. The user equipment according to claim 1, wherein the communications circuitry is configured to receive the data in blocks and the controller circuitry is configured to reconstruct the data from the constituent blocks.

5. The user equipment according to claim 1, wherein the communication circuitry is configured to communicate with second user equipment and to act as a relay between the infrastructure equipment and the second user equipment.

6. The user equipment according to claim 1, wherein the controller circuitry is configured to determine a speed of the user equipment.

7. The user equipment according to claim 1 wherein the first communication protocol has a shorter effective range than the second communication protocol.

8. The user equipment according to claim 1, wherein the communication circuitry is further configured to communicate the content data with the infrastructure equipment and second infrastructure equipment and the controller circuitry is further configured to:
 determine the amount of the content data required to reproduce in real-time when transitioning between communicating with the infrastructure equipment and communicating with the second infrastructure equipment; and
 download the amount of the content data from the infrastructure equipment.

9. The user equipment according to claim 8, wherein when moving between the infrastructure equipment and the second infrastructure equipment, the controller circuitry is further configured to
 reproduce the content data;
 monitor the amount of non-reproduced downloaded content data; and
 wherein when the amount of remaining downloaded content data is at or below a threshold value, the communication circuitry is further configured to download further content data over a network.

10. The user equipment according to claim 9, wherein the further network is a cellular network.

11. The user equipment according to claim 9, wherein the further content data is at a bitrate less than the content data downloaded from the infrastructure equipment.

12. The user equipment according to claim 1, wherein the fixed infrastructure equipment is a traffic light.

13. An infrastructure equipment comprising:
 first communication circuitry configured to communicate data with user equipment including second communication circuitry configured to communicate data with the infrastructure equipment and second controller circuitry configured to operate in a first mode using a first communication protocol and operate in a second mode using a second communication protocol, wherein the first communication protocol is a cellular protocol having a lower bandwidth than the second communication protocol, and switch operation from the first mode to the second mode when the user equipment is at or below a threshold speed of movement of the user equipment and is within a range from fixed infrastructure equipment operating using the second communication protocol, wherein the second communication circuitry is configured to receive a first type of data in the first mode and a second type of data in the second mode, whereby the second type of data includes content data comprising firmware updates and/or real-time content; and
 first controller circuitry configured to:
 operate in the first mode when the user equipment is stationary,
 wherein the switch operation from the first mode to the second mode is further based on a traffic instruction of the infrastructure equipment.

14. An infrastructure equipment comprising:
communication circuitry configured to communicate data with user equipment; and
interface circuitry configured to receive information defining a status of an indicator in a network of signalling indicators,
wherein the communication circuitry is further configured to initiate a connection with the user equipment depending on the received information defining the status of the indicator, the status anticipating that the user equipment is travelling at or below a threshold speed of movement of the user equipment and is within a range from the communication circuitry, and
wherein the communication circuitry is further configured to transmit a first type of data in a first mode and a second type of data in a second mode, whereby the second type of data includes content data comprising firmware updates and/or real-time content,
wherein a switch operation from the first mode to the second mode is further based on a traffic instruction of the infrastructure equipment.

15. A method of controlling user equipment, the user equipment including communication circuitry configured to communicate data with infrastructure equipment and controller circuitry, the method comprising:
operating in a first mode using a first communication protocol;
operating in a second mode using a second communication protocol, wherein the first communication protocol is a cellular protocol having a lower bandwidth than the second communication protocol;
switching from the first mode to the second mode when the user equipment is at or below a threshold speed of movement of the user equipment and is within a range from fixed infrastructure equipment operating using the second communication protocol; and
receiving a first type of data in the first mode and a second type of data in the second mode, wherein the second type of data includes content data comprising firmware updates and/or real-time content,
wherein the method further comprises:
determining an amount of the second type of data required to reproduce in real-time when the user equipment is moving,
downloading the amount of the second type of data,
monitoring an amount of non-reproduced downloaded data of the second type of data during reproduction of the second type of data, and
when the amount of remaining non-reproduced downloaded data of the second type of data is at or below a threshold value, downloading additional second type of data.

16. A non-transitory storage medium configured to store computer readable code, which, when loaded onto a computer, configures the computer to perform a method according to claim 15.

17. The method as claimed in claim 15, further comprising
communicating the content data with the infrastructure equipment and second infrastructure equipment;
determining an amount of the content data required to reproduce in real-time when transitioning between communicating with the infrastructure equipment and communicating with the second infrastructure equipment; and
downloading the amount of the content data from the infrastructure equipment.

18. The method as claimed in claim 17, further comprising:
when transitioning between communicating with the infrastructure equipment and communicating with the second infrastructure equipment, reproducing the content data;
monitoring the amount of non-reproduced downloaded content data; and
when the amount of remaining downloaded content data is at or below a threshold value, downloading further content data over a network.

19. A user equipment comprising:
communication circuitry configured to communicate data with infrastructure equipment and controller circuitry configured to:
operate in a first mode using a first communication protocol and operate in a second mode using a second communication protocol, wherein the first communication protocol is a cellular protocol having a lower bandwidth than the second communication protocol, and
switch operation from the first mode to the second mode when the user equipment is at or below a threshold speed of movement of the user equipment and is within a range from fixed infrastructure equipment operating using the second communication protocol, wherein the communication circuitry is configured to receive a first type of data in the first mode and a second type of data in the second mode, whereby the second type of data includes content data comprising firmware updates and/or real-time content,
wherein the switch operation from the first mode to the second mode is further based on a traffic instruction of the fixed infrastructure equipment.

* * * * *